United States Patent [19]

Koch et al.

[11] Patent Number: 5,372,831
[45] Date of Patent: Dec. 13, 1994

[54] TREATMENT OF COFFEE OIL

[75] Inventors: Peter Koch; Jean-Michel Parchet, both of Orbe, Switzerland

[73] Assignee: Nestec S.A., Vevey, Switzerland

[21] Appl. No.: 25,626

[22] Filed: Mar. 2, 1993

[30] Foreign Application Priority Data

Mar. 16, 1992 [EP] European Pat. Off. ............ 92104455

[51] Int. Cl.$^5$ .............................................. A23F 5/48
[52] U.S. Cl. .................................... 426/388; 426/386; 426/387; 426/417
[58] Field of Search ........................ 426/417, 386-388

[56] References Cited

U.S. PATENT DOCUMENTS

| | | |
|---|---|---|
| 3,035,921 | 5/1962 | Carver et al. |
| 3,535,118 | 11/1970 | Klein et al. |
| 3,903,312 | 9/1975 | Clinton et al. ........................ 426/594 |
| 4,156,031 | 5/1979 | Hamell et al. .................. 426/386 X |
| 4,335,149 | 6/1982 | Stipp ................................. 426/386 |

OTHER PUBLICATIONS

Sivetz, et al. Coffee Processing Technology, vol. 2, pp. 1-5, 21-30, and 175-182 (1963).
Sivetz, et al., Coffee Technology, pp. 452-460, 568-571 (1979).

*Primary Examiner*—Joseph Golian
*Attorney, Agent, or Firm*—Vogt & O'Donnell

[57] ABSTRACT

Coffee oil is treated by filtering it so that upon contact with a frost charged with coffee aromas to transfer coffee aromas from the frost to the oil, the aqueous and oil phases obtained are decantable. Filtering is effected by passing a coffee oil at a temperature of less than 30° C. through a filter having a pore size of up to 25 μm and may be carried out with diatomite added to the oil to be filtered and/or under a partial vacuum.

10 Claims, 1 Drawing Sheet

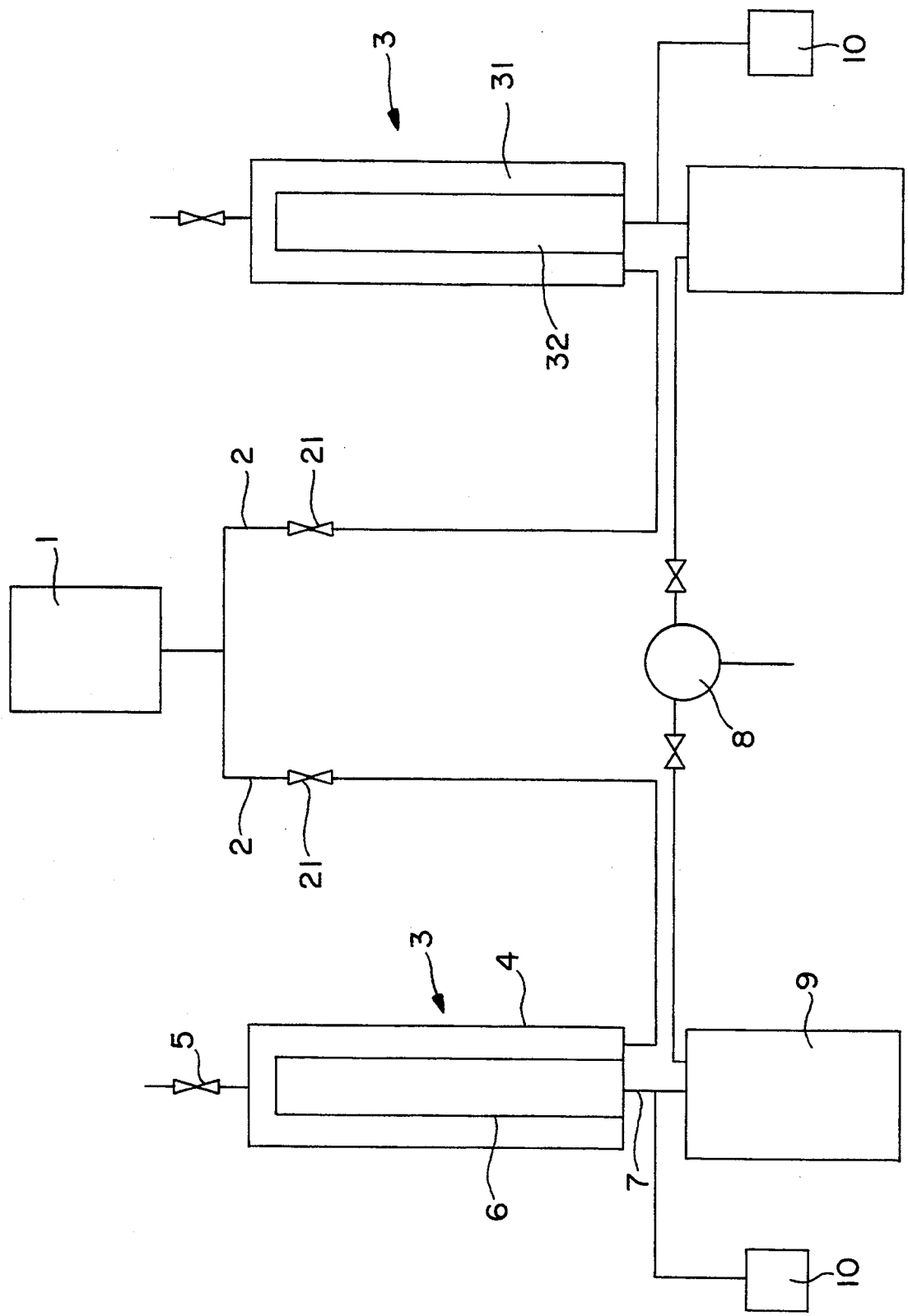

TREATMENT OF COFFEE OIL

BACKGROUND OF THE INVENTION

This invention relates to a process for treating a coffee oil intended to be contacted with a frost charged with coffee aromas.

The production of soluble coffee powder by spray-drying or freeze-drying of a coffee extract obtained by percolation of an extraction liquid through cells filled with ground roasted coffee is known to produce an end product which does not have the aroma of a roasted coffee.

Various solutions have been proposed in which an oil, generally a coffee oil, is enriched with coffee aromas and then sprayed onto the soluble coffee powder. The main source used for the aromas are the aromas given off by the ground roasted coffee.

Thus, it is known to circulate an inert gas, such as carbon dioxide, through a ground roasted coffee. This inert gas becomes charged with aromas, and a frost is formed by condensation of the carbon dioxide-entrained moisture and aromas. This frost is then contacted with an oil which thus partly recovers the aromas present in the frost. This may be done by directly contacting the oil with the frost consisting of carbon dioxide, water and aromas. Another method of contacting is to sublimate the carbon dioxide and to contact the residual aqueous phase charged with aromas with the oil. The oil obtained, which is enriched with aromas, may then be re-incorporated in a soluble coffee powder.

The coffee oil may be an oil obtained by pressing roasted coffee which has not been extracted or, more often, an oil obtained from the grounds resulting from the extraction of ground roasted coffee with water. The oil obtained from non-extracted roasted coffee produces by-products, such as the press cake, which are difficult to utilize. In addition, the pressing of non-extracted roasted coffee involves losses of aromas which escape during pressing on are destroyed by the temperatures reached during pressing.

Contacting of the oil either with the frost charged with aromas or with the residual aqueous phase produces an emulsion of oil and water. However, it is not desirable to spray an oil and water emulsion onto a coffee nowder for various reasons. Firstly, the emulsion does not always have the same characteristics so that the process does not have the uniformity and reproducibility necessary for an industrial process. Secondly, the presence of water can be troublesome to the stability of the aromas. It is for this reason that it is advisable to separate the oil from the water it contains.

SUMMARY OF THE INVENTION

It has been found that the emulsion produced by the contacting noted above was too stable to enable the oil to be readily separated from the water. Reference is made hereinafter to contacting of the oil and the frost irrespective of whether this contact is direct or whether the oil is contacted with the residual aqueous phase obtained after sublimation of the carbon dioxide.

Accordingly, the problem addressed by the present invention was to provide a process for treating coffee oil before it is contacted with the frost charged with aromas which would enable a readily decantable emulsion of oil and water to be obtained.

Now, it has been found that the formation efta stable emulsion was attributable to the presence in the coffee oil of certain components which it has not been possible to identify. More particularly, it has been found that it is sufficient to filter the coffee oil to remove these components responsible for the stability of the emulsion and hence, to obtain an oil which, when contacted with a frost, is a readily decantable.

Accordingly, the present invention provides a process for treating a coffee oil intended to be contacted either with a frost consisting of carbon dioxide, water and coffee aromas or with the residual aqueous phase charged with aromas obtained after sublimation of the carbon dioxide present in the frost, in which the coffee oil is filtered beforehand, the temperature of the oil being below 30° C. during the filtration step.

Other features and advantages will become apparent from the following description in conjunction with the accompanying drawing Figure and Examples.

BRIEF DESCRIPTION OF THE DRAWING FIGURE

FIG. 1 diagrammatically illustrates an oil filtration unit for carrying out the process according to the invention.

DETAILED DESCRIPTION OF THE DRAWING FIGURE

As illustrated in the drawing Figure the filtration unit for carrying out the process according to the invention may be formed by a feed reservoir 1 in which the oil to be treated is placed. This reservoir is kept at a temperature set by a device which has not been shown, for example in the form of a coil immersed in the oil bath stirred by an agitator (not shown). Thus, the temperature of the oil is preferably kept between 18° C. and 25° C. because, below 15° C., the oil becomes too viscous to be filtered.

The feed reservoir 1 is connected by a feed pipe 2, equipped with a valve 21, to one (or more) a filter assembly, or assemblies, which have a detachable outer envelope 4 provided with a vent 5, a cylindrical filtration surface 6 and an outlet pipe 7, for the filtered oil, connected to a filtered oil storage reservoir 9 which itself is connected to means 8 for establishing a partial vacuum. Thus, each filter 3 consists of two concentric spaces separated by the filtration surface 6, the outer space 31, defined by the outer envelope 4 and the filtration surface 6, being connected to the feed reservoir 1, and the inner space 32 being connected to the means 8 for establishing a partial vacuum and to the storage reservoir 9. The installation preferably comprises two filters 3 intended to operate in alternation.

The filters 3 are filled by gravity by opening the feed valve 21 and the vent 5 of the outer envelope 4 until the oil reaches the level of the vent 5, filling the outer space 31. After closure of the valve 21 and the vent 5, the inner space 32 which is situated on the other side of the filtration surface 6, is placed under a partial vacuum by the means 8. During filtration, the oil passes inwards through the filtration surface 6, flowing into the storage reservoir 9.

The filtration head of variable volume is preferably directed into the feed reservoir 1 until the oil obtained is clear. The filtration head is understood to be the volume of oil which flows at the beginning of the filtration process. A clear oil is an oil which has no turbidity when examined by transparency in a test tube placed in front of a light source.

On completion of filtration, atmospheric pressure is re-established in the system.

Due to significant losses of pressure after the formation of a preliminary layer of deposit on the filtration surface 6, filtration is preferably limited to a certain time dependent upon the installation used. At the end of this time, filtration is stopped and the unfiltered oil still present in the outer space 31 is directed to the feed reservoir 1.

The detachable outer envelope 4 may be removed, and the deposit formed on the filtration surface 6 may thus be scraped by suitable means. Thereafter, steam under pressure is injected, in the opposite direction to filtration, through the outlet 7 from a steam source 10 into the inner space 32, i.e., outwards. The deposit which is not recovered by scraping is rapidly liquefied and eliminated. The filter is then dried and cooled by the passage of air under pressure. The total duration of this filter cleaning phase is an important parameter to be taken into account in the setting of the filtration time mentioned above. More particularly, to be able to operate continuously with two filters operating in alternation, the filtration time is preferably at least equal to the cleaning time. This is because, during the cleaning of one filter, the filtration process is continued in another filter.

Other filters than candle filters have been used equally successfully. Thus, various tests were carried out with press filters and with paper filters under pressure with or without a preliminary layer of diatomite. These filters gave comparable results.

EXAMPLES

Example 1

Various tests were carried out to demonstrate the influence which the pore size of the filtration surface has on the filtration rate. In addition, smooth filtration surfaces and pleated surfaces were used. Thus, filtering surfaces formed by metal candles 25 cm tall and 6 cm in diameter, marketed by the PALL company under the references MCS 1001 for the pleated surfaces (1200 cm$^2$) and MBS 1001 (450 cm$^2$) for the smooth surfaces were used. The pores were between 15 microns and 5 microns in size.

In all these tests, the starting oil was the same and was filtered for 2 hours at 20° C. under a residual pressure of 100 mm Hg.

The tests clearly show that, after filtration for 1 hour, the quantity of oil subsequently passing through the filter is independent of the pore size of the filter and independent of the nature of the filtration surface (pleated or smooth). This should be interpreted as the result of the formation of a preliminary layer on the filtration surface which blocks the pleats and makes a pleated surface work in the same way as a smooth surface. In addition, it is this preliminary layer which performs the actual filtration, the filtration surface serving as a support to the preliminary layer. This explains why the pore size of the filtration surface is only of relative importance and why, after formation of the preliminary layer, the quantity of oil passing through the filtration surface is independent of the pore size.

In fact, the pore size of the filtration surface only appears to be instrumental in determining the time required for the formation of a preliminary layer sufficient to enable the clear oil to be obtained. It only appears to determine the volume of the filtration head which has to be recycled to the feed reservoir. Since the pore size of the filtration surface is dependent in particular upon the oil to be treated, it may readily be determined by experimentation.

Nevertheless, there appears to be a maximum limiting pore size, at all events for the candle filters described above. Thus, filtration tests were carried out on installations of the type described above, but with filtration surfaces having a pore size of 25 microns. The volume of the recycled filtration head had to be increased to obtain a clear oil, in spite of which, the oil obtained, after contacting with the frost, produced an emulsion which did not decant as well.

Example 2

An oil obtained by pressing from grounds filtered by the process described in Example 1 and an identical, but non-filtered oil were contacted with a frost charged with coffee aromas, each producing an emulsion containing 30% water. The emulsion produced with the filtered oil showed a stable separation surface between the oil and the water by simple decantation, whereas the emulsion formed with a non-filtered oil could not be separated by decantation, the emulsion being stable.

This clearly shows that the process according to the invention enables a readily separable emulsion to be obtained.

Example 3

Filtration tests on oil obtained from grounds were carried out using metal candle filters marketed by the PALL company with a pore of size of 11 microns and a surface area of 2700 cm$^2$. To accelerate the formation of the preliminary layer required to obtain a clear oil, diatomite (marketed under the name of Celite 235) was added to the oil to be filtered.

These tests are summarized in the following Tables.

| Test 1 | | | |
|---|---|---|---|
| Quantity of Celite (%) | 2 | | |
| Filtration Temperature (°C.) | 20 | | |
| Reduced pressure (mm Hg) | 100 | | |
| Results | Time | Output of filtered oil | |
| | (minutes) | (g) | (kg/m$^2$) |
| | 30 | 1417 | 5.2 |
| | 60 | 2419 | 9.0 |
| | 90 | 3112 | 11.5 |
| | 120 | 3810 | 14.1 |
| Filtration head | 5 minutes 641 grams oil | | |

| Test 2 | | | |
|---|---|---|---|
| Quantity of Celite | 4 | | |
| Filtration Temperature (°C.) | 20 | | |
| Reduced pressure (mm Hg) | 100 | | |
| Results | Time | Output of filtered oil | |
| | (minutes) | (g) | (kg/m$^2$) |
| | 30 | 1886 | 7.0 |
| | 60 | 3225 | 11.9 |
| | 90 | 4283 | 15.9 |
| | 120 | 5180 | 19.2 |
| Filtration head | 5 minutes 1063 grams oil | | |

| Test 3 | | | |
|---|---|---|---|
| Quantity of Celite | 6 | | |
| Filtration Temperature (°C.) | 20 | | |
| Reduced pressure (mm Hg) | 100 | | |
| Results | Time | Output of filtered oil | |

-continued

|  | (minutes) | (g) | (kg/m²) |
|---|---|---|---|
|  | 30 | 3320 | 12.3 |
|  | 60 | 5351 | 19.8 |
|  | 90 | 6858 | 25.4 |
|  | 120 | 8083 | 29.9 |
| Filtration head | 2 minutes | | |
|  | 1051 grams oil | | |
| Test 4 | | | |
| Quantity of Celite | 10 | | |
| Filtration | | | |
| Temperature (°C.) | 20 | | |
| Reduced pressure (mm Hg) | 100 | | |
| Results | Time | Output of filtered oil | |
|  | (minutes) | (g) | (kg/m²) |
|  | 60 | 6470 | 24.0 |
|  | 120 | 10400 | 38.5 |
| Filtration head | 2 minutes | | |
|  | 667 grams oil | | |

It can thus be seen that the larger the quantity of celite used, the greater the output of filtered oil. In addition, test 1 was carried out using a filtration head of excessively low volume so that, on the one hand, the oil obtained did not have the required clarity and, on the other hand, the emulsion produced after contacting of this oil with a frost charged with aromas decanted poorly whereas, for tests 2, 3 and 4, decantation was entirely satisfactory.

Example 4

In order to show that the process according to the invention culminates in the elimination of chemical compounds and not just in a physical transformation, the filter cake recovered from the filtration surfaces was introduced into the filtered oil. It was clearly apparent that a filtered oil, such as obtained in Example 1, produced with the frost an emulsion which decanted very easily and that decantation became increasingly more difficult with increasing volume of the filter cake introduced into the oil.

Example 5

Tests were carried out to study various treatments of the oil, including:
 filtration of the oil at high temperature (up to 80° C.),
 prefiltration at 60° to 80° C. followed by filtration at 20° C.,
 heating of the oil to 80° C. followed by gradual cooling to 20° C. before filtration at 20° C., and
 degumming of the oil with acid or steam followed by filtration at 20° C.

All these tests produced an increase in the filtration rate. In each case, however, the oil produced formed a more stable emulsion than the oil which had not been subjected to the above treatments. A more stable emulsion is understood to be an emulsion which decants less quickly, if at all, or which, after decantation, produces an interface where emulsion residues remain.

More particularly, it was clearly apparent that an increase in the temperature of the oil during filtration resulted in a higher filtration rate, but at the same time in greater stability of the emulsion produced with this oil. Accordingly, it is advisable to filter the oil at a temperature below 30° C. in order to satisfy the requirements of decantation of the emulsion produced.

In addition, it was found that, by contrast, filtration at 20° C. followed by degumming with acid or steam did not have any adverse effect on decantation.

Accordingly, it would appear that any treatment of the oil before filtration has an adverse effect on decantation.

We claim:

1. A process for treating coffee oil comprising adding diatomite to a coffee oil, passing the coffee oil at a temperature of from 15° C. to less than 30° C. through a filter having a pore size of up to 25 µm, collecting filtered oil, contacting the collected filtered oil with a frost charged with aromas to obtain an oil phase charged with aromas and an aqueous phase decantable from the oil phase and decanting the aqueous phase from the oil phase to separate the phases.

2. A process according to claim 1 further comprising placing the oil and added diatomite under a partial vacuum and passing the oil through the filter under the partial vacuum.

3. A process for treating coffee oil comprising placing coffee oil at a temperature of from 15° C. to less than 30° C. under partial vacuum and passing the oil through a filter having a pore size of up to 25 µm under the partial vacuum, collecting filtered oil, contacting the collected filtered oil with a frost charged with aromas to obtain an oil phase charged with aromas and an aqueous phase decantable from the oil phase and decanting the aqueous phase from the oil phase to separate the phases.

4. A process according to claim 1 or 2 or 3 wherein the filter has a pore size of from 5 µm to 15 µm.

5. A process according to claim 1 or 2 or 3 wherein the coffee oil is filtered at a temperature of from 18° C. to 25° C.

6. A process according to claim 1 or 2 or 3 wherein the filtered oil is collected after formation of a filter filtration deposit for also filtering the oil.

7. A process according to claim 2 wherein the filter is a candle filter and wherein the added diatomite and oil to be filtered are supplied to an exterior surface of the filter and wherein the vacuum draws from an interior of the filter to draw the oil through the filter.

8. A process according to claim 3 wherein the filter is a candle filter and wherein the oil to be filtered is supplied to an exterior surface of the filter and wherein the vacuum draws from an interior of the filter to draw the oil through the filter.

9. A process according to claim 1 or 2 or 3 wherein the oil to be filtered is an oil pressed from coffee grounds and which has not been treated with an acid or steam to degum the oil prior to filtering.

10. A process according to claim 1 or 2 or 3 further comprising, prior to contacting the collected filtered oil with the frost, degumming the collected filtered oil and then contacting the degummed filtered oil with the frost.

* * * * *